US011410085B1

(12) United States Patent
Mudgil et al.

(10) Patent No.: US 11,410,085 B1
(45) Date of Patent: Aug. 9, 2022

(54) MACHINE-LEARNED ENTITY FUNCTION MANAGEMENT

(71) Applicant: Tekion Corp, San Ramon, CA (US)

(72) Inventors: Satyavrat Mudgil, Bengaluru (IN); Anant Sitaram, San Ramon, CA (US)

(73) Assignee: Tekion Corp, San Ramon, CA (US)

( * ) Notice: Subject to any disclaimer, the term of this patent is extended or adjusted under 35 U.S.C. 154(b) by 0 days.

(21) Appl. No.: 17/224,828

(22) Filed: Apr. 7, 2021

Related U.S. Application Data

(63) Continuation of application No. 17/222,972, filed on Apr. 5, 2021.

(51) Int. Cl.
*G06N 20/00* (2019.01)
*G06K 9/62* (2022.01)

(52) U.S. Cl.
CPC ........... *G06N 20/00* (2019.01); *G06K 9/6218* (2013.01); *G06K 9/6256* (2013.01); *G06K 9/6263* (2013.01)

(58) Field of Classification Search
CPC .... G06N 20/00; G06K 9/6263; G06K 9/6218; G06K 9/6256
See application file for complete search history.

(56) References Cited

U.S. PATENT DOCUMENTS

| | | | |
|---|---|---|---|
| 10,949,907 B1* | 3/2021 | Jain | G06N 3/0472 |
| 2014/0172754 A1* | 6/2014 | He | G06N 5/02 |
| | | | 706/12 |
| 2017/0006135 A1* | 1/2017 | Siebel | H04L 67/12 |
| 2020/0242506 A1* | 7/2020 | Kelly | G06N 3/088 |

* cited by examiner

*Primary Examiner* — John W Lee
(74) *Attorney, Agent, or Firm* — Fenwick & West LLP

(57) ABSTRACT

A system and a method are disclosed herein for machine-learned detection of outliers within entity functions. An entity management system uses machine learning to cluster data characterizing functions performed by entities, and determines one or more data clusters that are outliers. The system receives entity function data indicating a metric and a type, and provides the received data into a supervised machine learning model. The model is trained to apply a label to the entity function data, where the label indicates a classification of the data into a cluster (e.g., an outlier cluster). This outlier detection may inform the system's generation of a function monitor to guide rectifying action that addresses the detected outliers. The system may receive user input affirming or rejecting the classification of the data into a particular cluster. The system may leverage the user input to retrain the supervised machine learning model.

20 Claims, 9 Drawing Sheets

MACHINE-LEARNED ENTITY FUNCTION MANAGEMENT

CROSS REFERENCE TO RELATED APPLICATIONS

This application is a continuation of prior, co-pending U.S. application Ser. No. 17/222,972, filed on Apr. 5, 2021, which is incorporated herein by reference in its entirety for all purposes.

TECHNICAL FIELD

The disclosure generally relates to the field of data classification, and more particularly relates to enabling flexible entity function management based on outlier classifications.

BACKGROUND

Outlier detection for entity operations helps to prevent potential or further impact to these operations. Outliers in entity operations, however, may be more nuanced depending on the complexity of the entity. An outlier in one area of the entity may not be an outlier in another area. Addressing this problem in conventional systems may involve multiple machine learning models for clustering outliers, where each model can determine outlier clusters for different areas of an entity so that an outlier will eventually be detected (e.g., regardless of how outliers are defined across different areas). However, maintaining and applying multiple models for each area of an entity may consume excessive processing power, notwithstanding the processing needed to coordinate the results of the individual models to determine whether an outlier was detected within the entity as a whole.

SUMMARY

Systems and methods are disclosed herein for machine-learned detection of outliers within entity functions and payload requests. An entity management system uses machine learning to cluster data characterizing functions performed by entities and their requests to route payloads, and determines one or more data clusters that are outliers. In particular, a machine learning model clusters data from entity operations, which includes at least one cluster of outliers. This model does not need to be dedicated to any one area of an entity (i.e., a sub-entity). Rather, operations from multiple sub-entities may be input into the machine learning model, which outputs clusters that may represent outliers to any of the sub-entities. In this way, outliers for an entity as a whole may be detected without expending the processing power needed for multiple models or additional processing to coordinate the outputs of the individual models.

This outlier detection may inform the system's generation of a function monitor to guide rectifying action that addresses the detected outliers. Additionally, the outlier detection may drive a validation process to prevent detected outliers from incurring prospective harm to the entity. The system may leverage entity function data, payload data, and feedback received from an entity to optimize machine learning techniques to the entity. Similarly, the data may be used to dynamically adjust qualifications used to identify outliers (e.g., the expected values and deviation levels that define one or more groups of outliers). In this way, outlier detection is optimized, dynamic, and drives both remediating action (e.g., using function monitors) and preventative action (e.g., using validation processes).

In one embodiment, an entity management system trains a supervised machine learning model to apply a label to entity function data, where the label indicates a classification of the entity function data into a cluster of data (e.g., a cluster of outlier data). To train the supervised machine learning model, the system inputs training data into an unsupervised machine learning model and applies labels to two or more clusters that are output by the unsupervised machine learning model. Entries of the training data include respective metric and type information. For example, the training data includes historical entity function data with metric information describing a standard by which the entity's function is to be measured (e.g., to gauge whether the function can be considered an outlier) and type information describing the type of function performed. The clusters output by the unsupervised machine learning model include pairs of metrics and types that are each labeled with the corresponding label of the cluster (e.g., pairs are labeled as an outlier or non-outlier). The supervised machine learning model, trained using these labeled clusters, may subsequently label unlabeled entity function data received by the system, which may provide the supervised machine learning model's classification to a user for feedback. The system may receive user input affirming or rejecting the classification and retrain the supervised machine learning model using the received user input, strengthening an association between the entity function data and the label applied to it if the user affirms the classification and weakening the association if the user rejects the classification.

The entity management system may determine a function monitor field and generate the function monitor field on a function monitor after classifying the entity function data into an outlier cluster. The function monitor field may include a completion date, function description, a delegate identifier, or combination thereof. The system may identify, based on the classification of the entity function data into a cluster, a level of deviation of the entity function data from an expected metric range, where each cluster output by the unsupervised machine learning model corresponds to a respective level of deviation. The system may determine a delegate identifier associated with the level of deviation after accessing a delegate table with delegate identifiers associated with the levels of deviation, where the delegate identifier may be included in the generated function monitor field. The expected metric range may be determined based on historical entity function data. While a first function monitor field is generated on a first function monitor, a second function monitor field having the delegate identifier included in the first function monitor field may be generated on a second function monitor (e.g., of a supervisor).

In some embodiments, the entity management system may provide the entity function data into a statistical model that is configured to determine a likely completion date, likely function description, an identifier of a likely delegate, or combination thereof. The system may determine, based on historical entity function data and historical function monitor data having user-specified function monitor fields, correlations between the user-specified function monitor fields and historical metric and type information. The system may use entity function data of another entity to determine a delegate identifier to be included in a function monitor field, where a metric of the other entity's function data is associated with the determined delegate identifier (e.g., the delegate in one entity is tasked with a function measured by the same metric as a delegate in another entity).

When weakening an association between a label and entity function data, the entity management system may reduce a likelihood that the entity function data is classified into the outlier cluster and in turn, reduce a corresponding likelihood that the function monitor field is generated on the function monitor. An example of a metric may be a difference between current entity function data and historical entity function data. Another example of a metric may be a forecasted value of the entity function data. The labels applied to the clusters output by the unsupervised machine learning model may be specified by a user.

In yet another embodiment, the entity management system receives a request to route a payload to a destination, where the payload indicates a size and a type. The system provides the size and type into a supervised machine learning model, which the system trains to apply a label to the payload using the output of an unsupervised machine learning model. In particular, the system inputs training data into the unsupervised machine learning model, where each entry of the training data includes respective size and type information, and the unsupervised machine learning model clusters the training data into two or more clusters. At least one of the two or more clusters is identified as an outlier cluster. With the two or more clusters, the system applies respective labels to the respective size and type pairs of the training data, where the applied labels indicate, for the outlier cluster, that a validation function is to be performed before the payload is routed to the destination. The system receives, as an output from the supervised machine learning model, an indication to perform a validation function. In response to receiving this indication, the system transmits the payload to a validation destination.

The entity management system may receive feedback from the validation destination that indicates an association between the payload and the validation function (e.g., that the validation function is or is not appropriate for this payload). The system may generate, using the received feedback, a supplemental training set and retrain the supervised machine learning model using that supplemental training set. The supervised machine learning model may be further trained to apply the label to the payload by generating a training set using the labeled respective size and type pairs of the training data. The system may use this training set to train the supervised machine learning model. The respective size and type information is, in some embodiments, representative of payloads from multiple entities. Size, for example, may correspond to an amount of time needed to perform a function.

In addition to receiving an indication to perform a validation function, the entity management system may perform the validation function. In some embodiments, performing the validation function involves determining payload validators and receiving validation resolutions from one or more of the payload validators. Performing the validation function may alternatively or additionally include rejecting the request to route the payload to the destination, determining a recommended modification to the request based on characteristics of the outlier cluster, and transmitting the recommended modification to a requestor device from which the request was received. The two or more clusters output by the unsupervised machine learning model may be associated with respective levels of deviation from an expected size range. In some embodiments, a cluster of the two or more clusters is a non-outlier cluster, and a non-outlier label is applied to the non-outlier cluster indicating that the request to route the payload to the destination is valid (e.g., authorized).

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Entity Management System Environment

Figure 1:
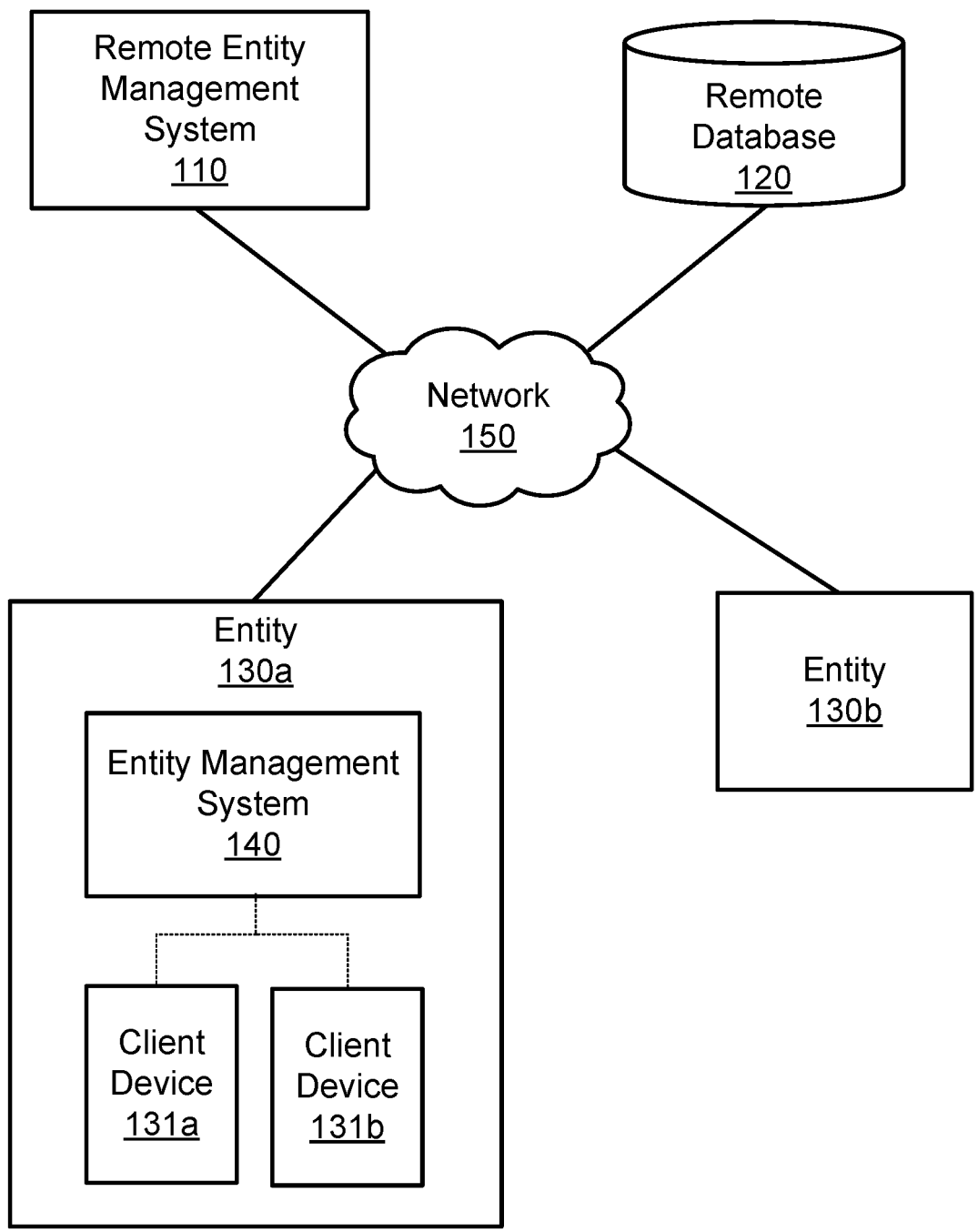
FIG. 1 is a block diagram of a system environment in which an entity management system operates, in accordance with at least one embodiment.

FIG. 1 is a block diagram of system environment 100 in which entity management system 140 operates, in accordance with at least one embodiment. System environment 100 includes remote entity management system 110, remote database 120, entities 130a and 130b, client devices 131a and 131b, entity management system 140, and network 150. System environment 100 may have alternative configurations than shown in FIG. 1, including for example different, fewer, or additional components. For example, entity 130b may include an entity management system and client devices as shown in entity 130*a*.

Within system environment 100, entity management systems 110 or 140 detect outliers within operations of entities 130*a* or 130*b*. As referred to herein, an "outlier" is an empirical value within data collected from an enterprise or a predictive value derived from the collected data that deviates from an expected value or range of values. For example, an enterprise may service an expected range of five to ten requests daily, and days when eleven or more requests or four or less requests are served are considered as outliers. As referred to herein, "entity functions" are operations performed by entities. These operations may be performed to serve other entities or serve users within the entities. As referred to herein, "delegates" and "supervisors" are roles in which users within entities may perform or supervise entity functions. A "delegate" may be a user to which an entity function is assigned for completion by the user. A "supervisor" may be a user supervising the delegate or the entity function. One example of an entity function may be routing payloads within an entity or between entities.

As referred to herein, a "payload" is a transferrable resource or designation of a resource to be transferred. For example, a delegate of entity 130*a* may request to route a payload (i.e., a "payload routing request") including a tool from entity 130*b* to entity 130*a* to perform an entity function of repairing an automobile. Entity management systems 110 or 140 may use one or more machine learning models to detect there is an outlier within the payload routing request or within the entity function record associated with the automobile repair. As referred to herein, "entity function data" may refer to an entity function record or a collection of multiple entity function records. Machine-learned outlier detection is described in the description of entity outlier classifier 220 of FIG. 2.

Upon detecting outliers within operations of entities 130*a* or 130*b*, entity management systems 110 or 140 determine a responsive action that enables the entities to address the outlier. To address outliers detected within entity functions, the entity management system may maintain a function monitor. The function monitor may enable users to receive notifications that outliers within entity functions were detected, confirm whether the outlier detection is accurate, and track the entity function or a relevant entity function to manage or prevent exacerbation of certain entity functions. Furthermore, the entity management system improves the machine-learned outlier detection using the user's confirmation regarding the detection's accuracy. In this way, the entity management system may optimize outlier detection to a particular entity's operations.

Similarly, to address outliers detected within payload routing requests, the entity management system may perform validation functions. Following a particular validation function, the entity management system may notify a user that an outlier within a payload routing request was detected and request the user to review or modify the payload routing request to avoid routing a payload that likely should not be routed. The entity management system may determine how the payload should be requested based on its classification of payload requests that are non-outliers. The entity management system may optimize its machine-learned classification of outliers to an entity's payload routing requests using the user's feedback from the review of the payload (e.g., a confirmation or rejection of the payload request as an outlier). The determination of responsive actions are described in the description of function monitor manager 230 and validation module 240 of FIG. 2.

Remote entity management system 110 provides machine-learned classification of entity functions and payloads from a remote server to entities 130*a* and 130*b* through network 150. In some embodiments, entities can remotely access the functionalities of the entity management system described herein in addition or alternatively to a local version of the system (e.g., entity management system 140). For example, client device 131*a* of entity 130*a* may access system 110 when it is not on a local, secured network maintained by entity 130*a*. In such an example, the functionalities provided to client device 131*a* by remote system 110 may be the full functionality of local system 140 or a subset of the functionality (e.g., specifiable by an administrator of systems 110 or 140 or entity 130*a*). As referred to herein, "administrators" are users with access to modify the behavior of or access the data maintained by entity management system 110 or 140. In some embodiments, users of entities may be administrators.

Remote entity system 110 may be capable of performing the full functionality of the entity management system described herein. For example, remote system 110 may train and apply a supervised machine learning model using data stored in remote database 120, and transmit the resulting output from the model to one of entities 130*a* or 130*b*. In another example, remote system 110 may train machine learning models and provide the trained models to local systems such as entity management system 140.

Remote database 120 stores records of entity functions. Entities 130*a* and 130*b* may transmit their respective records over network 150 to database 120 for storage. In some embodiments, each entity function record indicates a metric and type for an entity function. Entity function records may be created by an entity during its operation. For example, users of an entity may generate reports of operation, which may serve as entity function records. In another example, an administrator may specify that user actions on client devices correspond to particular entity functions and the entity management system monitors those functions to automatically generate the entity function records.

A metric for an entity function may be a method or standard by which a function's performance is measured. In this way, a metric may be used to by an entity management system to determine whether the performance is an outlier. Metrics may include a frequency at which a function is performed, a duration with which a function's performance lasts, a rate that a function is approved, a record of accumulation or loss, a change in measurement over time, any suitable measurement for performance, or a combination thereof. Metrics may be historical or forecasted (e.g., using a machine learning model trained on historical entity function records).

In one example, a metric of entity 130*a* may be the frequency with which entity 130*a* requests payloads to be routed or the rate at which the payload route requests of entity 130*a* are approved. In this example a corresponding type of the entity record may be of a "payload" type. A type for an entity function may be a category into which a function may be organized into for the purposes of analysis (e.g., machine-learned classification) and management (e.g., using a function monitor). The types may correspond to payloads, payload requests, requests, delegate function, supervisor function, entity function, any suitable category for functions performed within an entity, or a combination thereof.

Remote database 120 stores records of payload routing requests. Entities 130*a* and 130*b* may transmit their respective records over network 150 to database 120 for storage.

In some embodiments, each payload routing request indicates a size and type that describes the payload and a destination to which the payload is to be routed. A size of a payload may be a measure of a consumable resource required of the payload recipient or requestor. In some embodiments, the size may be a measure of a non-consumable resource such as a number of personnel required to fulfill a function associated with the payload. Sizes may include an amount of time, area or volume, computing cycles, materials, any suitable measurement of a resource, or a combination thereof. For example, a size of a payload that client device 131a requests to route may be five hours, which may be the amount of time needed to perform a function requested by a user of client device 131a.

In this example a corresponding type of the payload may be of a "function" type. A type for a payload may be a category describing what the payload requests from its intended recipient. The entity management system may use the types to organize payload routing requests for the purposes of analysis (e.g., machine-learned classification) and validation. The types for payload routing requests may correspond to functions, resources, any suitable category for describing a request made through the payload, or a combination thereof. A destination to which the payload is to be routed may be specified by a user and may be another entity (e.g., entity 130b) or another user (e.g., transmitting a resource from a user associated with client device 131b to a user associated with client device 131a).

Remote database 120 may also store the outputs from machine learning models maintained by remote management systems 110 or 140. For example, entity management system 140 transmits the classifications output from a machine learning model trained to classify payloads or payload requests as an outlier or non-outlier to database 120, which may be used by the entity management system to train other machine learning models (e.g., for other entities having similar profiles to entity 130a).

Figure 7:
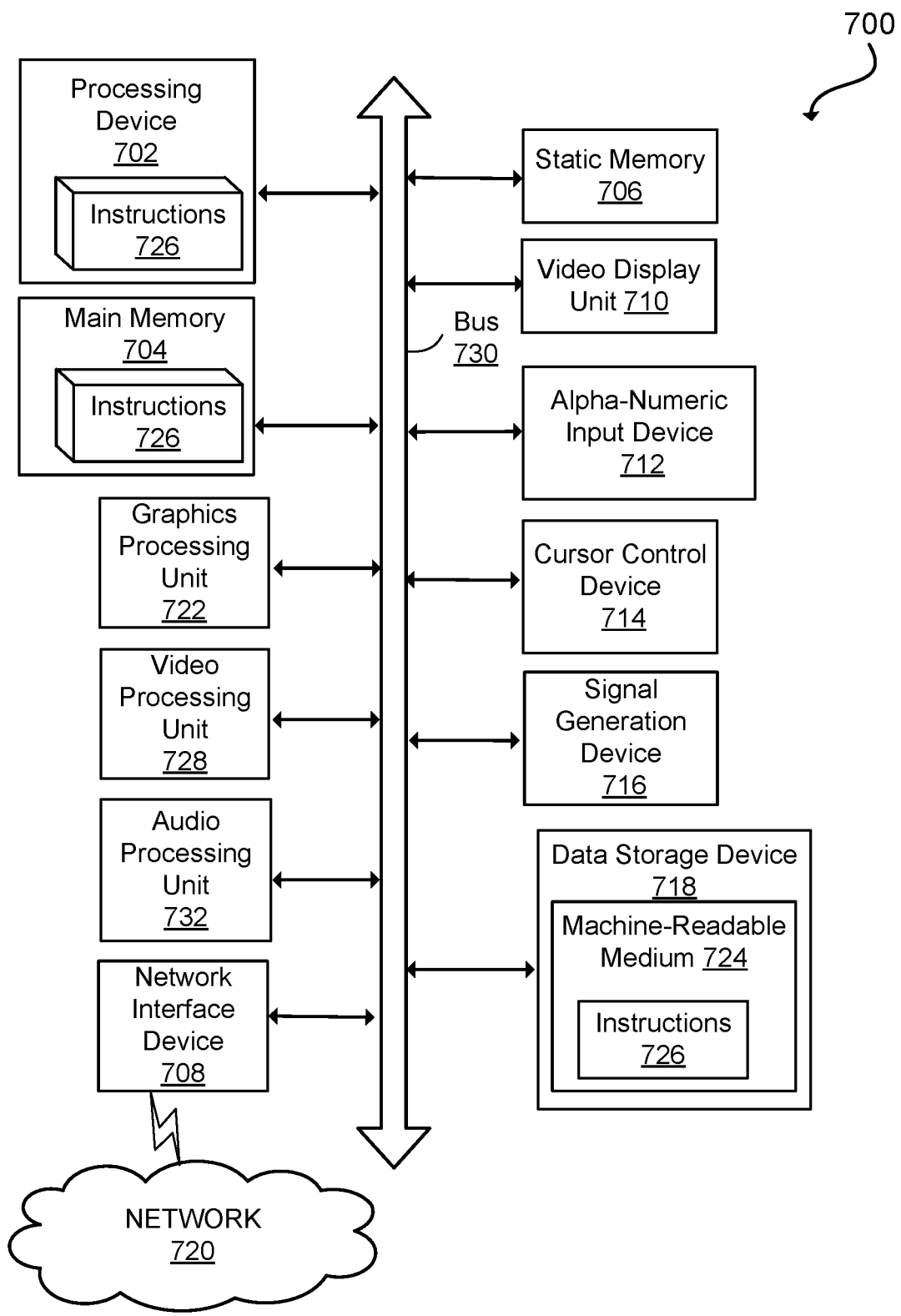
FIG. 7 is a block diagram illustrating components of an example machine able to read instructions from a machine-readable medium and execute them in a processor (or controller), in accordance with at least one embodiment.

Entity 130a is an entity using entity management system 140 to apply machine-learned classification to monitor entity functions or validate payload routing requests. Entity 130b may similarly have access to a local version of the entity management system described herein or access remote entity management system 110 to monitor entity functions or validate payload routing requests. Example entities include an Internet retailer, a small business, a bureaucratic agency, an engineering company, an educational institution, a consulting firm, a healthcare provider, a bank, or any suitable combination thereof. As referred to herein, communication with an entity involves communication with a computing device of the entity, where the computing device is capable of receiving user input as well as transmitting and/or receiving data via network 150. Some or all of the components of a computing device are illustrated in FIG. 7.

Client devices 131a and 131b of entity 130a are examples of computing devices for users to monitor entity functions or validate payload routing requests as enabled by entity management system 140. For example, system 140 may provide for display on client device 131a a function monitor for a user to track functions performed within entity 130a. Function monitors managed by entity management system 140 may be locally installed at devices 131a and 131b or remotely accessible at system 110 or 140 through network 150. Client devices 131a and 131b may be associated with users of entity 130a having different authorizations (e.g., a supervising user and a delegated user or "delegate"). In some embodiments, the computing device of an entity is a conventional computer system, such as a desktop or a laptop computer. Alternatively, the computing device may be a device having computer functionality, such as a personal digital assistant (PDA), a mobile telephone, a smartphone, or another suitable device. The computing device is configured to communicate with systems 110 or 140 via network 150, for example using a native application executed by the computing device and provides functionality of systems 110 or 140, or through an application programming interface (API) running on a native operating system of the computing device, such as IOS® or ANDROID™.

Entity management system 140 provides machine-learned classification of entity functions and payloads entity 130a. In some embodiments, entity management system 140 is accessible exclusively to authorized client devices of entity 130a. The functionalities performed by system 140 to support entity 130a in monitoring its functions and validating its payload requests may be optimized to entity 130a at least due in part to system 140's use of data collected by 130a. For example, system 140 may train machine learning models to perform the classification described herein using historical entity function and payload routing requests from entity 130a and no other entities. In another example, system 140 may place greater weight upon data from entity 130a than placed upon other entities when training the machine learning models. Entity management system 140 is described in further detail in the description of FIG. 2.

The network 150 may serve to communicatively couple remote entity management system 110, remote database 120, entities 130a and 130b, client devices 131a and 131b, and entity management system 140. For example, the entity management system 140 and the remote entity management system 110 are configured to communicate via the network 150. In some embodiments, the network 150 includes any combination of local area and/or wide area networks, using wired and/or wireless communication systems. The network 150 may use standard communications technologies and/or protocols. For example, the network 150 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 150 may be encrypted using any suitable technique or techniques.

Entity Management System

Figure 2:
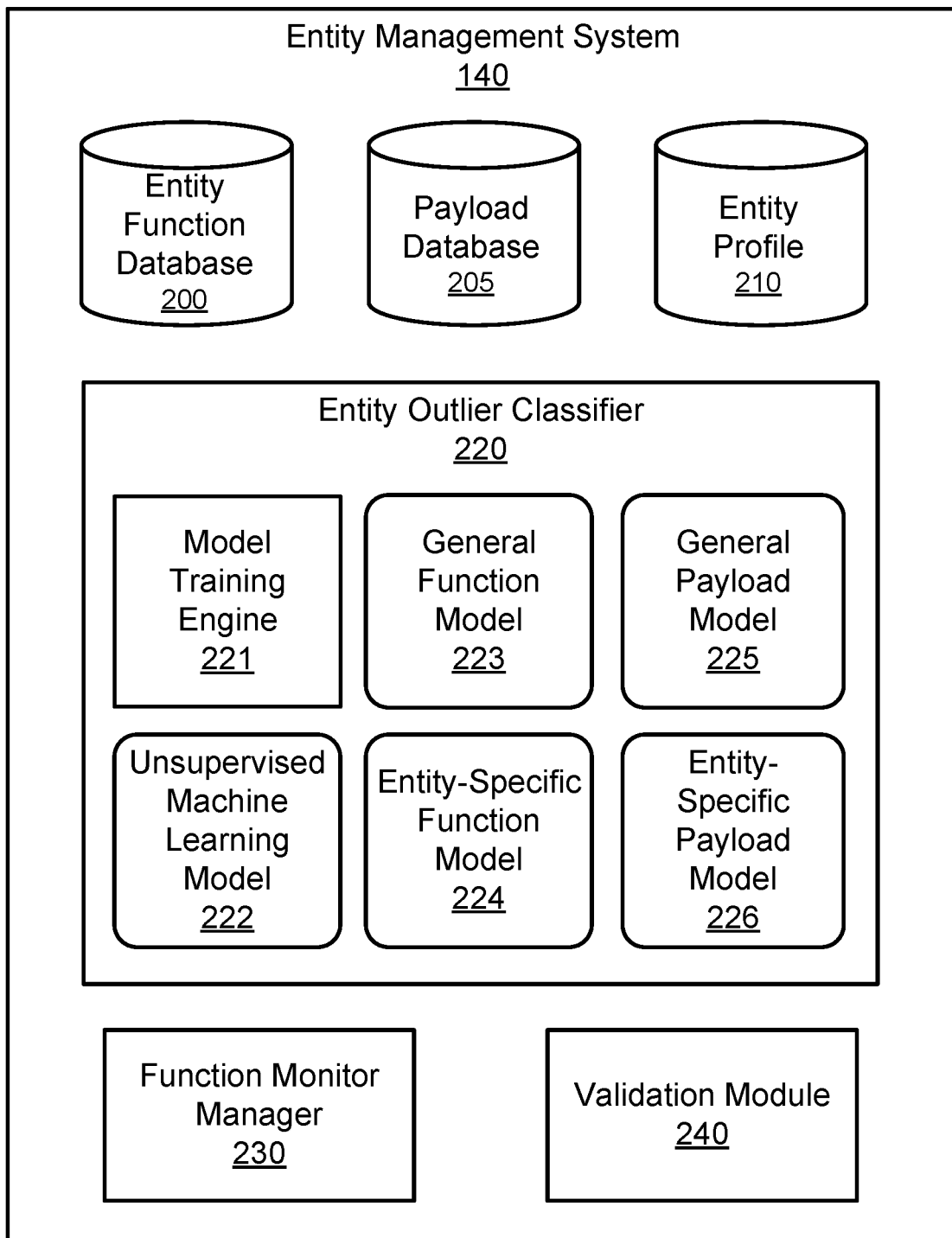
FIG. 2 is a block diagram of an entity management system of an entity of FIG. 1, in accordance with at least one embodiment.

FIG. 2 is a block diagram of entity management system 140 of entity 130a of FIG. 1, in accordance with at least one embodiment. Entity management system 140 includes or accesses local databases such as entity function database 200, payload database 205, and entity profile 210. Entity management system 140 includes software modules such as entity outlier classifier 220, function monitor manager 230, and validation module 240. Entity outlier classifier 220 may include software modules such as model training engine 221 and one or more machine learning models such as unsupervised machine learning model 222, general function model 223, entity-specific function model 224, general payload model 225, and entity-specific payload model 226. Entity management system 140 may have alternative configurations than shown in FIG. 2, including different, fewer, or additional components. For example, entity outlier classifier 220 may include additional statistical models for estimating a likelihood that an entity function record or a payload routing request is an outlier.

Entity function database 200 stores records of entity functions performed by entity 130a. Entity 130a may transmit its records over network 150 to remote database 120 for storage. As described in the description of remote database 120, each entity function record may indicate at least a metric and type for an entity function. The metric and type may vary depending on the entity and the functions performed by the entity. For example, entity 130a may be an automotive supplier whose entity functions include a number of requests (e.g., to repair automobiles) received over time. In this example, a metric may be the frequency of requests received (e.g., a number of received daily) and a type may be "requests." Further in this example, entity management system 140 may determine there is an outlier in the number of requests being received in the day (e.g., a 300% increase in the average number of daily requests received).

Records stored within entity function database 200 may include other information associated with entity functions in addition or alternative to metric and type. In some embodiments, an entity function record may include information relating to the function. For example, an entity function record having the type "request" related to automobile repairs may include data from each request such as the repair requested, the type of vehicle serviced, the make and model of the vehicle, identifying information of the vehicle's owner, etc. In some embodiments, an entity function record may be associated with an identifier of a delegate or supervisor. For example, a delegate is tasked with a function that is monitored by entity management system 140, which annotates the entity function record with an identifier of the delegate (e.g., an email address, an identification number issued by entity 130a, a name, a hardware identifier of client device 131b, etc.). Similarly, entity management system 140 may annotate the entity function record with an identifier of a supervisor overseeing the delegate.

Payload database 205 stores records of payload routing requests generated within entity 130a. Entity 130a may transmit its records over network 150 to remote database 120 for storage. As described in the description of remote database 120, each payload routing request may indicate at least a size and type that describes the payload. The size and type may vary depending on the entity and the functions performed by the entity. For example, entity 130a may be an automotive supplier whose payload routing requests relate to transferring or requesting resources (e.g., an automotive part or the time of a specialist) between other automotive entities (e.g., an automotive manufacturer, another automotive supplier, a mechanic, etc.). In this example, a size may be the number of automotive parts requested and a corresponding type may be "resources." As referred to herein, "payload data" includes data characterizing a payload, a payload routing request, or combination thereof. Payload data may be stored by entity management system within payload database 205.

Records stored within payload database 205 may include other information associated with payload requests in addition or alternative to size and type. In some embodiments, a payload routing request may be associated with a duration of active status. For example, the duration of a payload routing request may be measured by the time between the generation of a payload routing request by client device 131b and a validation decision by client device 131a. In some embodiments, a payload may be associated with an identifier of a delegate or supervisor. For example, a delegate using client device 131b generates the payload routing request and entity management system 140 annotates the generated request with an identifier of the delegate. Similarly, entity management system 140 may annotate the generated request with an identifier of a supervisor overseeing functions delegated to the delegate.

Entity profile 210 contains records of identifiable information of the entity. Identifiable information includes a name, a location, an establishment date, a number of personnel operating the entity, a description of services or goods offered by the entity, a list of entities with which the entity interacts to perform operations, or any suitable identifier characterizing the entity. Entity management system 140 may use the information within entity profile 210 to optimize the classifications performed by entity outlier classifier 220, the management services of function monitor manager 230, or the validation decisions determined by validation module 240. For example, model training engine 221 of classifier 220 may represent identifiable information of entity 131a as a dimension of a feature vector used input into one of the machine learning models (e.g., entity-specific function model 224) to determine that a periodically generated report delegated to two entity personnel that is overdue by four days is an entity function that, for entity 131a having ten personnel in total, is unusual and hence, an outlier.

Entity outlier classifier 220 trains and applies one or more models for entity management system 140 to monitor functions using function monitor manager 230 or validate payload routing requests using validation module 240. Classifier 220 detects outliers within entity functions or payload routing requests using machine learning models, and this detection triggers system 140 to perform an appropriate action to address the detected outliers. Classifier 220 may train the models locally using model training engine 221 or outsource training to remote entity management system 110. Classifier 220 may train and apply generalized and optimized models to classify the entity function data and payload data. The optimized models, such as entity-specific function model 224 and entity-specific payload model 226, may be customized to a particular entity (e.g., entity 131a) to support the characteristics and performance that entity. Classifier 220 accesses databases 200, 205, and 210 and performs classification on the accessed data to produce groups or clusters within the data and detect outliers within the data.

Machine learning models of entity outlier classifier 220 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable supervised or unsupervised learning algorithm.

Model training engine 221 trains machine learning models for use in detecting outliers within entity function and payload data. For example, model training engine 221 may train machine learning models to detect outliers within entity functions performed within entity 130a and whose performance progress may be recorded on client devices 131a or 131b. The detected outliers may then be used by function monitor manager 230 to generate a function monitor field on a function monitor to track whether action has been taken to address the outlier in entity function. In another example, model training engine 221 may train machine learning models to detect outliers in payload routing requests generated by client devices of entity 130a. The detected outliers may then be used by validation module 240 to perform a validation function such as routing the request to an authorized supervisor to review the request or routing the request back to the requestor with a modification suggestion to avoid being flagged as an outlier again.

To train a machine learning model, model training engine 221 may apply labels to data that has been clustered by unsupervised machine learning model 222 and input the labeled data into a supervised machine learning model (e.g., models 223-226). In some embodiments, engine 221 receives user input indicating that a particular label is to be applied to a data cluster. Using this user input, engine 221 may determine that the particular label is to be applied to a similar data cluster. Engine 221 may determine similarity of data clusters using correlation coefficients, cosine similarity, mean squared error, any suitable technique for measuring the distance between data sets, or a combination thereof. Engine 221 uses labeled data to train models 223-226, which then apply the labels to similar data.

The labels applied by model training engine 221 to train the models may correspond to two or more respective data clusters. In one example, engine 221 applies labels "outlier" and "non-outlier" to data clusters produced by unsupervised machine learning model 222. In another example, engine 221 applies different labels for respective outliers, each representing a different level of deviation from an expected value or range. Engine 221 may receive an expected value or range for a data value of an entity function record (e.g., entity function metric) or payload routing request (e.g., payload size) and corresponding levels of deviation from a user or administrator. In this way, a user can specify expected values or ranges and how deviations from them are quantified. For example, for an entity function related to vehicle repair, a user specifies that the metric of expected time to perform the repair is two to four hours. The user can further specify that a deviation by fifteen minutes outside of that range may correspond to one outlier label and a deviation by eight hours may correspond to another outlier label.

Alternatively or in addition, model training engine 221 may determine the expected value or range based on historical data (e.g., using remote database 120). For example, engine 221 accesses entity profile 210 to determine characteristics of entity 131a, retrieves entity function records of similarly characterized entities from remote database 120, and determines expected values and ranges of metrics for respective types of entity functions. In some embodiments, engine 221 determines the level of deviation based on a determined value or range or manually-specified value or range. For example, entity 130a may specify that the expected time to perform a particular vehicle repair is three hours. Engine 221 may determine, using records in entity function database 200, one or more deviation levels based on the durations of time that the repair has previous deviated from the expected time. In a similar example, engine 221 uses the expected time it has determined from historical records of database 120 and deviations in time also contained in the historical records to determine the deviation levels. While duration of time was used as an example of a metric of an entity function, engine 221 may perform similar determinations using other metrics or for payload routing requests using corresponding sizes of payloads.

In some embodiments, model training engine 221 may tailor training data to an particular entity. For example, engine 221 organizes data from databases 200-210 into vectors and applies one or more labels to the organized data to train a machine learning model (e.g., entity-specific models 224 or 226) to classify data in a manner that is optimized to the entity functions and payloads of entity 130a. In some embodiments, engine 221 uses training data aggregated from multiple entities. For example, engine 221 organizes data from remote database 120 and applies labels to the organized data to train a machine learning model (e.g., general models 223 or 225) to classify data in a manner that is generalized to entity functions and payloads of multiple entities (e.g., entities 130a and 130b).

Model training engine 221 may retrain machine learning models based on feedback received at client devices 131a and 131b. In some embodiments, entity management system 140 generates a prompt for display on a graphical user interface (GUI) on client devices 131a and 131b, where the prompt enables the user to provide feedback regarding the classifications output by the machine learning models (e.g., whether an entity function is an outlier). A user may provide a response to the prompt indicating that the entity function is not an outlier. For example, the user provides feedback that a number of vehicle repair requests received is typical for a time of year when colder weather causes more breakdowns. Alternatively, a user may provide a response to the prompt indicating that the entity function is an outlier. For example, the user provides feedback that a duration of eighteen hours to perform a single repair on a vehicle is an outlier since the vehicle was manufactured within the year and had below-average mileage.

In another example, a user may provide feedback indicating whether a payload routing request was correctly classified as an outlier. The user may provide feedback indicating that the request is an outlier, in turn indicating that the association between the payload and the validation function performed for the outlier is proper. Alternatively, the user provides feedback indicating that the payload routing request was incorrectly classified by a machine learning model of entity outlier classifier 220 as an outlier, in turn indicating that the association between the payload and the validation function is improper.

Using the received feedback, model training engine 221 may generate a supplemental training set. The received feedback may correspond with a label that may be applied to the data being classified. For example, the user indicating that a payload routing request is not an outlier may, through the indication to entity management system 140, cause model training engine 221 to apply a "non-outlier" label to the classified data. The newly labeled data may be included within the supplemental training set generated to retrain machine learning models of entity outlier classifier 220. For example, engine 221 may retrain entity-specific payload model 226 with the supplemental training set that reflects the user's feedback correcting a previous classification by model 226. In some embodiments, the supplemental training set may reflect the received feedback through an adjustment of weights, parameters, or hyperparameters tuning the machine learning models.

The retraining performed by model training engine 221 may involve strengthening or weakening an association between a label and classified data (e.g., entity function data or payload data). Engine 221 may strengthen the association after receiving user input affirming a classification by a machine learning model of entity outlier classifier 220 and weaken the association responsive to receiving user input rejecting the classification. Strengthening an association may involve maintaining the label applied by a supervised machine learning model and using the labeled data in a supplemental training set when retraining the supervised machine learning model. Weakening an association may involve modifying the label applied by the supervised machine learning model and retraining the model using the relabeled data.

Strengthening the association may increase the likelihood that the machine learning model applies the label to similar data and increase a likelihood that a downstream module performs a particular action associated with the classification. For example, model training engine 221 retrains payload models 225 and 226, using feedback from a user affirming an outlier classification of a payload routing request, which maintains or increases a likelihood that validation module 240 will perform the validation function when a similar payload routing request is generated. Similarly, weakening the association may decrease the likelihood that a downstream module performs a particular action associated with the classification. For example, model training engine 221 retrains function models 223 and 224, using feedback rejecting an outlier classification of entity function data, which reduces a likelihood that function monitor manager 230 will flag the entity function data as an outlier or generate a function monitor field on a user's function monitor.

Unsupervised machine learning model 222 determines two or more clusters of data within entity function data or payload data. The unclustered data for input into model 222 may be accessed by entity management system 140 from one or more of entity function database 200, payload database 205, or remote database 120. Model 222 may use K-means, fuzzy c-means, expectation maximization, hierarchical, quality threshold, minimum spanning tree, any suitable computational technique for partitioning volumes of structured or unstructured data into clusters, or a combination thereof.

In some embodiments, a user of entity 130a or an administrator of entity management system 140 may specify a number of clusters to be output by unsupervised machine learning model 222. For example, the user may specify that model 222 determines two clusters from payload data within payload database 205, which the user manually labels or model training engine 221 determines to label using the labels "outlier" and "non-outlier." Alternatively, the user may specify that model 222 determines more than two clusters within data. For example, the user specifies that model output five clusters, which the user manually labels or engine 221 determines to label using a "non-outlier" label and four different labels for various degrees to which the data can be classified as an outlier. Model 222 may provide the clustered data to model training engine 221 for labeling and/or training one or more of models 223-226.

In this way, a single model may be used across a whole entity to cluster outliers for a variety of classification models. For example, data from both an automotive repair sub-entity and a finance sub-entity within an automotive entity be input into model 222 for outlier detection. To enable this, the data from disparate sub-entities of an entity may be organized into a single format for outlier detection within the entity as a whole. The data input into the single, clustering unsupervised machine learning model 222 may characterize an entity function or a payload. In an example where entity function data is input into model 222, an automotive repair sub-entity may consider a periodic report generated on the last day of every month to be a non-outlier while a finance sub-entity considers this to be an outlier that should have been generated on the third week of the month. A combined input into model 222 from both sub-entities puts the automotive repair sub-entity's data into contrast with data from other sub-entities to detect outliers within the entities as a whole. In an example where payload data is input into model 222, the automotive repair sub-entity may consider a payload having a size of ten auto parts to be an outlier that is above an expected number of two auto parts, while the finance sub-entity considers this a non-outlier that is within expected range of one to twenty auto parts. Model 222 outputs clusters for outliers regardless of sub-entities' different outlier definitions, which avoids a need for multiple clustering models for each sub-entity, and thus saves processing power.

General function model 223 is trained using labeled clusters of entity function data sourced from multiple entities to apply a label to entity function data received as input. The entities may be of varying size (e.g., number of personnel), fields (e.g., area of operations being conducted), locations, ages, or any suitable identifiable characteristic. In this way, general function model 223 is not necessarily tailored to any one entity or its characteristics. Model 223 may receive entity function data as input responsive to a user's request or periodically and output a labeled version of the data. For example, entity outlier classifier 220 may periodically apply model 223 to data within entity function database 220 that has not been previously input into the model. Model 223 outputs labeled data indicating whether there are outliers detected in the entity function records. In this example, entity management system 140 can be used to periodically check for outliers, such as abnormal activity, within the latest entity operations. In another example, a user may request a report be generated by system 140 and specify entity function data to be input into model 223 for outlier detection.

In some embodiments, model 223 may be trained using training data that accounts for entity characteristics such that labels applied by model 223 reflect entity characteristics. As described in the description of model training engine 221, feature vectors may be generated by engine 221 that quantify entity characteristics of entity profile 210 so that model 223 may output a label to entity record data based on entity characteristics. While general function model 223 may, in this manner, be used to output a label that may be optimized to an entity, entity outlier classifier 220 also maintains entity-specific function model 224 that allows for outlier detection tailored to an entity and its entity function records. Similarly, general payload model 224 may also be trained to account for entity characteristics to be optimized to an entity, but entity-specific payload model 226 may also be used to detect outliers in a manner that is optimized to the entity.

Entity-specific function model 224 is trained using labeled clusters of entity function data sourced from a single entity to apply a label to entity function data received as input. As depicted in system environment 100, the entity from which data is collected to train model 224 is entity 130a. By limiting the training data to that of entity 130a, model 224 labels entity function data using what users of entity 130a would consider as outliers and non-outliers rather than what, for example, entity 130b considers to be outliers and non-outliers. In some embodiments, entity-specific function model 224 is a version of general function model 223 that has been retrained using feedback from entity 130a users. An example of training and retraining model 224 is described in the description of FIG. 3.

General payload model 225 is trained using labeled clusters of payload data sourced from multiple entities to apply a label to payload data received as input. Similar to general function model 223, model 224 is not necessarily tailored to any one entity or its characteristics. Model 224 may receive entity function data as input responsive to a user's request or periodically and output a labeled version of the data. For example, entity outlier classifier 220 may periodically apply model 224 to data within payload database 205 that has not been previously input into the model. Model 224 outputs labeled data indicating whether there are outliers detected in the payload records. In this example, entity management system 140 can be used to periodically check for outliers, such as abnormal payloads, within the latest batch of payload routing requests. In another example, a user may request a report be generated by system 140 and specify payload data to be input into model 224 for outlier detection.

Entity-specific payload model 226 is trained using labeled clusters of payload data sourced from a single entity to apply a label to payload data received as input. As depicted in system environment 100, the entity from which data is collected to train model 226 is entity 130a. By limiting the training data to that of entity 130a, model 226 labels payload data using what users of entity 130a would consider as outliers and non-outliers rather than what, for example, entity 130b considers to be outliers and non-outliers. In some embodiments, entity-specific function model 226 is a version of general function model 225 that has been retrained using feedback from entity 130a users. An example of training model 226 is described in the description of FIG. 4.

Function monitor manager 230 determines a responsive action based on classifications of entity function data by entity outlier classifier 220. In one example, the responsive action may be to generate a notification with a description of the detected outlier within the entity record data and determine a client device or user account to which the generated notification is to be transmitted. The notification may include the expected value or range associated with the entity function and/or a level of deviation from that value or range. For example, manager 230 generates a notification for an entity function related to test driving automobiles at entity 130a, where the metric is the number of test drives taken per day, the expected value is determined to be five per day, and the deviation for a particular day was twenty over the expected value. Manager 230 may then determine that client device 131a of a supervisor is to receive the generated notification. For example, manager 230 may access entity function records of the test drives and entity profile 210 (e.g., organizational hierarchies stored within the profile) to determine that a user authorizing those test drives is reporting to the supervisor using client device 131a.

Function monitor manager 230 may provide the generated notification for display on a client device (e.g., client device 131a). The notification generated by manager 230 may include a prompt requesting feedback from a user regarding the accuracy of the classification of the outlier by entity outlier classifier 220. Manager 230 may receive the user's feedback affirming or rejection the classification and provide the response to model training engine 221 to retrain one of the machine learning models of classifier 220. If an outlier is not detected, manager 230 may determine to generate a notification with a confirmation that no outliers were detected or that no notification should be generated. In some embodiments, manager 230 may generation the notification with the confirmation that no outliers were detected and provide a prompt requesting a user to provide feedback on the classification of the non-outlier classification. The user's feedback may similarly be used by entity system 140 to retrain machine learning models. The notification may be provided within a GUI of a function monitor, which is described in the description of FIG. 5.

Function monitor manager 230 may maintain function monitors for users. Function monitors may track entity functions (e.g. tasks) delegated to a delegate (e.g., by a supervisor). Function monitors may include one or more function monitor fields corresponding to the entity functions tracked. Function monitor fields may include a completion date (e.g., a deadline), a function description (e.g., a description of the task), a delegate identifier (e.g., a name), any suitable information to track an entity function, or a combination thereof. Manager 230 may determine a function monitor field to generate onto a function monitor. For example, manager 230 receives an outlier classification from entity outlier classifier 220 that a periodically drafted report is overdue by a week, which is a deviation of twelve days from the expected delivery date that the delegate has historically delivered the report. Manager 230 may generate a function monitor field including a completion date of a week from the current date, a function description identifying the late report, and the name of the delegate.

Function monitor manager 230 may use statistical models to determine the function monitor field. In some embodiments, manager 230 provides the entity function data associated with the detected outlier (e.g., the data used by entity outlier classifier 220 to detect the outlier) into a statistical model. The statistical model may be configured to determine a likely completion date, a likely function description, a likely delegate identifier, any suitable information to track an entity function, or a combination thereof. Entity management system 140 may use historical entity function data and historical function monitor data of entity 131a, a similar entity (e.g., similar in size, location, operation, etc.), or a general sampling of entities to determine one or more correlations between entity functions and function monitor data.

The historical function monitor data may include user-specified function monitor fields. The historical entity function may include historical metric and type information. In one example, entity management system 140 uses manually entity monitor fields entered by users of entity 130a and entity function data of entity 130a to generate a statistical model correlating monitor fields to entity functions. A delegate may manually track periodic report generation, specifying a completion date (e.g., end of each month), a function description, and the delegate's name (e.g., automatically by generating the field on a monitor associated with the delegate's account or profile). In this example, system 140 may correlate the delegate's entries on a function monitor with the generation of the report within entity 130a such that entity function records related to report generation is highly correlated with a likely function description of "month-end report" and a likely completion date of the end of the month.

To determine a function monitor field, function monitor manager 230 may use a level of deviation associated with an outlier (e.g., as determined by entity outlier classifier 220) to identify the values to populate the function monitor field. In some embodiments, manager 230 accesses a delegate table (e.g., an organizational hierarchy) maintained within entity profile 210, where the delegate table includes identifiers for delegates and supervisors and associations (e.g., mappings) between the identifiers and respective levels of deviations from an outlier. For example, levels of deviation of an entity function for report drafting include exceeding the expected delivery date by one week and two weeks, and a first supervisor is associated with the first level of deviation by one week while a second supervisor is associated with a second level of deviation by two weeks.

In this example, entity function manager 230 may identify, based on a classification from classifier 220 indicating that an outlier has been detected, that there is a deviation by two weeks, identify the second supervisor using the delegate table, and populate a function monitor field with an identifier of the second supervisor (e.g., on a delegate's monitor or the supervisor's monitor). In some embodiments, function monitor manager may link function monitors of delegates and their respective supervisors by generating a function monitor field on both a delegate's function monitor and a supervisor's function monitor. Function monitor manager 230, thus, enables users to be alerted of an outlier and monitor a function to be performed to prevent the outlier from harming or further harming operations of the entity.

Validation module 240 determines a responsive action based on classifications of payload data by entity outlier classifier 220. In one example, a payload routing request is classified as an outlier and module 240 determines that the responsive action is to transmit the payload routing request to a validation destination. As referred to herein, a "validation destination" may be a client device or user account that receives payload routing requests for validation. Module 240 may generate a notification including information about the payload routing request at a client device associated with a supervisor (e.g., the supervisor's client device is a validation destination). In some embodiments, validation module 240 may determine the validation destination to which the outlier payload routing request is transmitted. Similar to function monitor manager 230 using a delegate table to determine a client device onto which a notification of an entity function outlier is generated, module 240 may use a delegate table or other form of data structure organizing users of entity 130a to determine a supervisor associated with the delegate or delegate's client device that has generated the payload routing request. In some embodiments, entity outlier classifier 220 classifies a payload routing request as a non-outlier and module 240 determines that the responsive action is to proceed to route the payload to its destination (e.g., from entity 130a to entity 130b).

Validation module 240 may generate a notification of the payload routing request on a GUI for display on a client device. For example, module 240 generates a notification of an outlier routing request on client device 131a. The notification may include information about the payload routing request such as the size of the payload, type of the payload, the author of the request, and destination to which the payload was requested to be routed. For example, the notification on client device 131a shows that a delegate using client device 131b has requested that a payload designating twenty hours (e.g., size) of the delegate's service (e.g., type) be provided to entity 130b. In some embodiments, the notification includes a prompt requesting a user to provide feedback regarding the accuracy of the classification determined by entity outlier classifier 220. The prompt may request the user to affirm or reject the classification (e.g., that the payload routing request is an outlier). In some embodiments, entity management system 140 uses the user input to retrain a machine learning model of classifier 220.

In some embodiments, validation module 240 determines that the responsive action includes a validation function associated with the outlier. Module 240 may determine the validation function to be executed. In some embodiments, module 240 determines to send the payload routing request to a supervisor and request confirmation of the payload routing request from the supervisor before routing the payload to its destination. For example, client device 131b generates a payload routing request that is flagged by entity outlier classifier 220 as an outlier, validation module 240 determines to send the request to client device 131a and displays a prompt requesting the supervisor confirm that the payload may be routed to its destination. In some embodiments, module 240 may determine multiple payload authorizers (e.g., supervisors) to send the payload routing request to and request that each payload authorizer provide an authorization resolution (e.g., a confirmation or rejection of the payload routing request).

Validation module 240, in determining a responsive action to take after an outlier is detected, may determine a modification that may be made to the payload routing request such that the request would not be classified as an outlier and provides the modification as a recommendation to a user's client device. Module 240 may use an expected value associated with a payload to determine the modification that may be made to avoid an outlier classification for the payload. For example, for a payload routing request including a monetary value (e.g., a size) to be transferred to entity 130b in exchange for an automotive part, the request generated by a user of client device 131b, entity outlier classifier 220 may determine that an expected value of the size is an amount of four hundred dollars for the automotive part requested. Module 240 may use this expected size value and the payload's size of eight hundred dollars to recommend to the user of client device 131b that a size reduction by four hundred would not trigger an outlier classification.

Entity Management Models: Training and Applications

Figure 3:
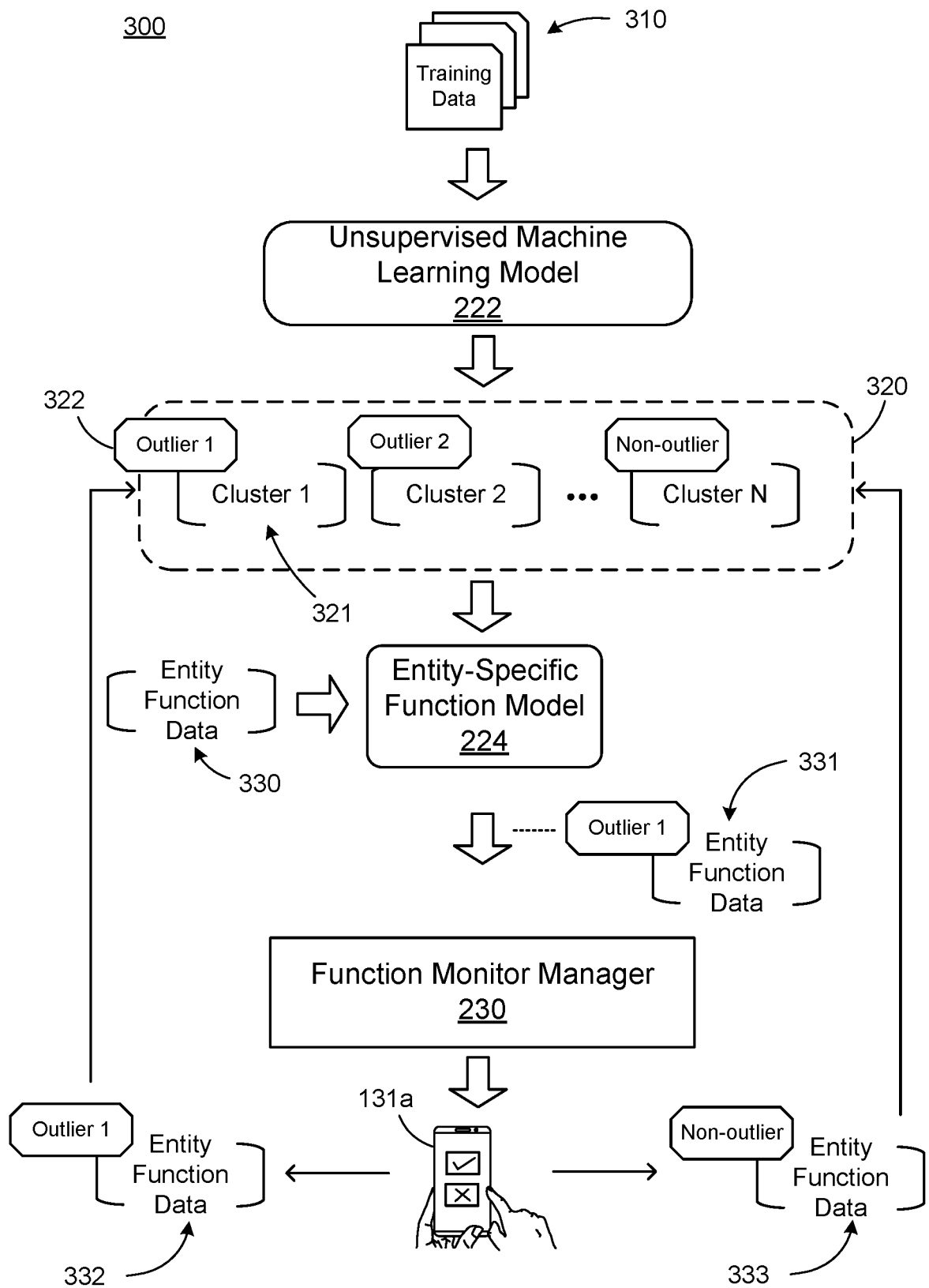
FIG. 3 is a diagram illustrating a process for training and applying a machine learning model for classifying entity function data, in accordance with at least one embodiment.

FIG. 3 is a diagram illustrating process 300 for training and applying a machine learning model for classifying entity function data. An entity management system described herein (e.g., entity management system 140) performs process 300. Model training engine 221 of entity management system 140 inputs training data 310 into unsupervised machine learning model 222. Training data 310 may include multiple entries each having metric and type information of an entity function. For example, training data 310 may include data describing a frequency (i.e., a metric) at which an entity resolves requests (i.e., type of entity function) or an amount of time (i.e., a metric) needed to complete a periodically generated report (i.e., type of entity function). Unsupervised machine learning model 222 outputs two or more clusters of data from training data 310.

Model training engine 221 may apply labels (e.g., label 322) to the clusters (e.g., cluster 321) output by unsupervised machine learning model 222. The labels may indicate whether the data in the cluster is an outlier or not. Engine 221 may input labeled clusters 320 into entity-specific function model 224 to train the model to apply a label to subsequently received entity function data. Although model 224 is shown, entity management system 140 may train or apply general function model 223 as an alternative or in addition to model 224. System 140 inputs entity function data 330 into model 224, which applies label 322 to entity function data 330 and outputs labeled entity function data 331. For example, entity function data may reflect a record that entity 130a resolved two requests in a week, where an expected frequency of resolution is ten per week. Label 322 may be used to indicate a level of deviation corresponding to the deviation between the recorded frequency of two requests and expected frequency of ten requests.

Entity management system 140 transmits the labeled entity function data 331 to function monitor manager 230, which determines a responsive action to be performed to address the outlier. Manager 230 may generate a notification including information about the outlier entity function record, the classification by entity-specific function model 224, and a prompt requesting confirmation that the classification is accurate. Manager 230 may determine that the notification should be transmitted to client device 131a (e.g., determining the appropriate supervisor of the entity function is associated with client device 131a). System 140 may receive, from client device 131a, user input indicating whether the classification is accurate. In response to receiving user input affirming the outlier classification, model training engine 221 may generate a supplemental training set including the labeled entity function data 322 (i.e., entity function data 330 labeled with label 322 as confirmed by the user). In response to receiving user input rejecting the outlier classification, engine 221 may generate a supplemental training set including the labeled entity function data 333 (i.e., entity function data 330 labeled with a different label associated with non-outliers as indicated by the user). The supplemental training set may be labeled clusters 320 with the addition of labeled data 332 or 333. Engine 221 uses the supplemental training set to retrain entity-specific function model 224.

Figure 4:
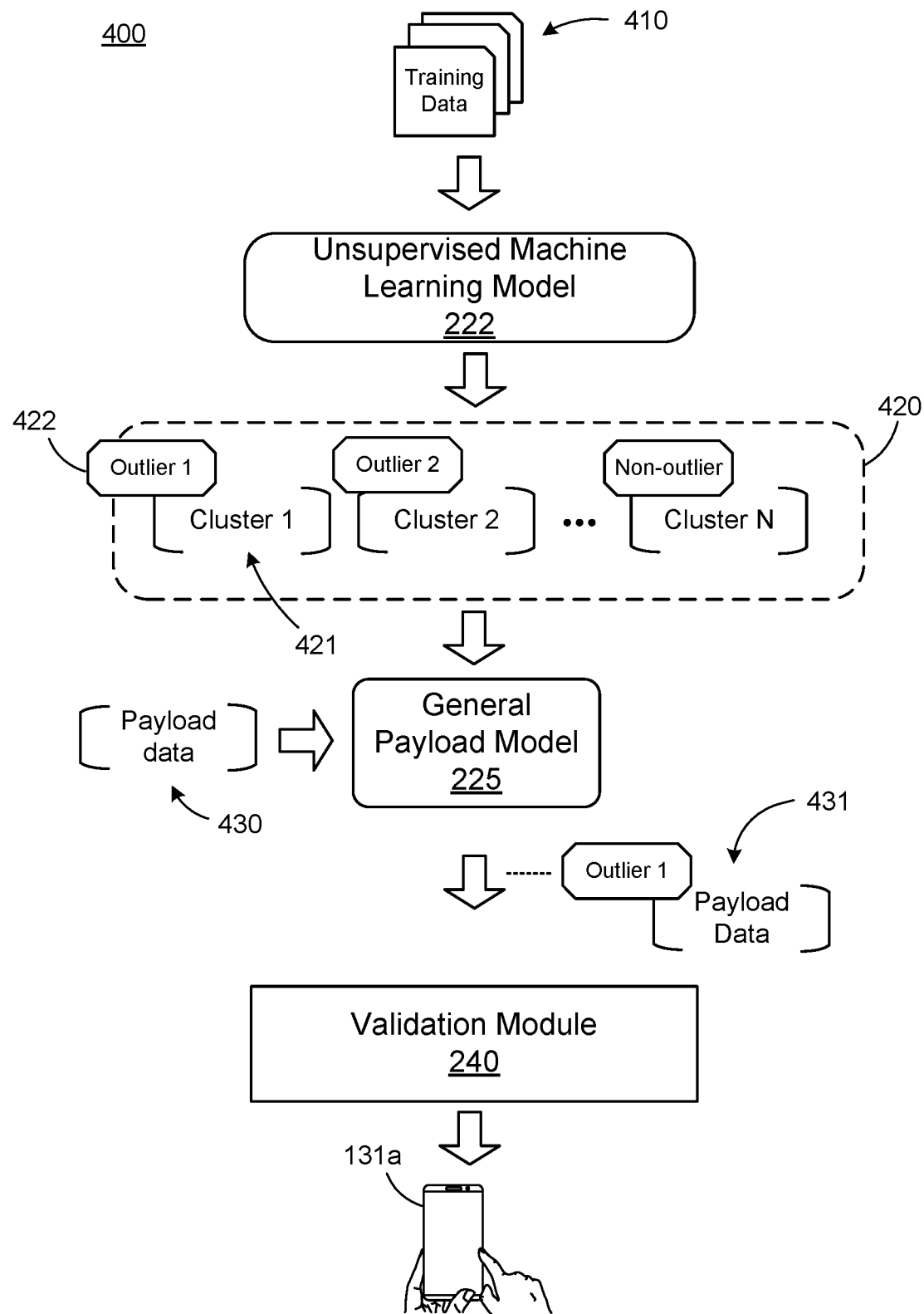
FIG. 4 is a diagram illustrating a process for training and applying a machine learning model for classifying payload data, in accordance with at least one embodiment.

FIG. 4 is a diagram illustrating process 400 for training and applying a machine learning model for classifying payload data. An entity management system described herein (e.g., entity management system 140) performs process 400. Model training engine 221 of entity management system 140 inputs training data 410 into unsupervised machine learning model 222. Training data 410 may include multiple entries each having size and type information of an payload routing request. For example, training data 410 may include data describing a quantities (e.g., a size) of automotive parts (e.g., a type) requested from another entity (e.g., entity 130b). Unsupervised machine learning model 222 outputs two or more clusters of data from training data 410.

Model training engine 221 may apply labels (e.g., label 422) to the clusters (e.g., cluster 421) output by unsupervised machine learning model 222. The labels may indicate whether the data in the cluster is an outlier or not. Engine 221 may input labeled clusters 420 into general payload model 225 to train the model to apply a label to subsequently received payload data. Although model 225 is shown, entity management system 140 may train or apply entity-specific payload model 226 as an alternative or in addition to model 225. System 140 inputs payload data 430 into model 225, which applies label 422 to entity function data 430 and outputs labeled entity function data 431. For example, payload data may reflect a record that client device 131b requested to route a payload of one engine to entity 130b, where an expected amount of engine parts routed to entity 130b is zero.

Entity management system 140 transmits the labeled entity function data 431 to validation module 240, which determines a responsive action to be performed to address the outlier. Module 240 may generate a notification including information about the outlier payload routing request, the classification by general payload model 225, and a prompt requesting confirmation that the classification is accurate. Module 240 may determine that the notification should be transmitted to client device 131a (e.g., determining the appropriate supervisor of the user of client device 131b is associated with client device 131a). Module 240 may request an authorization resolution from the user of client device 131a as part of a validation function performed in response to detecting the payload routing request outlier. The authorization resolution may be a decision determined by the user of client device 131a to allow the payload routing request to be transmitted to the destination indicated in the routing request.

Although not depicted in FIG. 4, process 400 may include receiving, from client device 131a, user input indicating whether the classification is accurate. In response to receiving user input affirming the outlier classification, model training engine 221 may generate a supplemental training set including the labeled entity function data with a label corresponding to the confirmation that the payload routing request is an outlier. In response to receiving user input rejecting the outlier classification, engine 221 may generate a supplemental training set including the labeled entity function data with a label corresponding to a correction that the payload routing request is a non-outlier. The supplemental training set may be labeled clusters 320 with the addition of labeled data accounting for the user input. Engine 221 may use the supplemental training set to retrain general payload model 225.

Entity Management Interfaces

Figure 5:
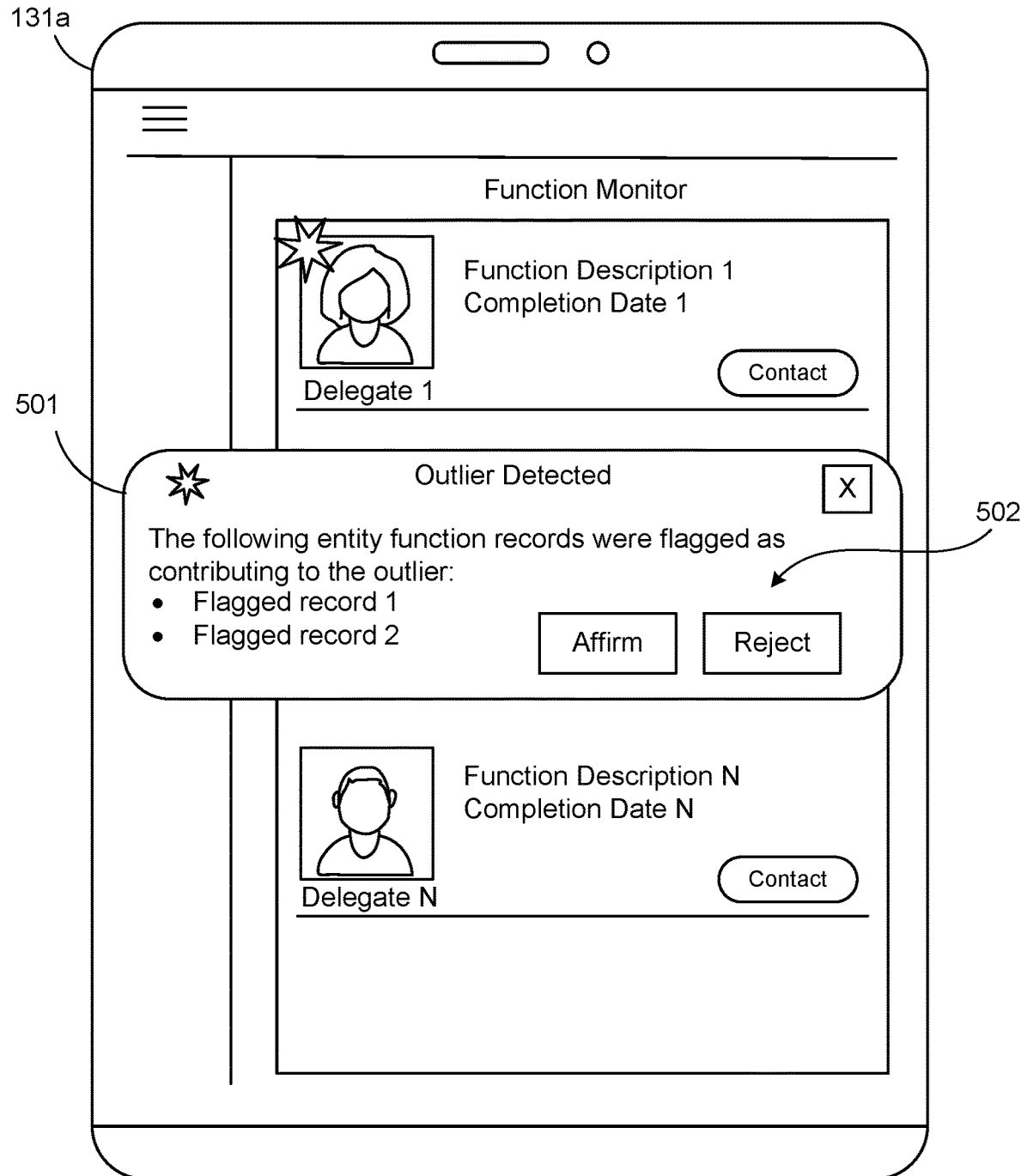
FIG. 5 depicts a graphical user interface (GUI) for monitoring entity functions, in accordance with at least one embodiment.

FIG. 5 depicts GUI 500 for monitoring entity functions, in accordance with at least one embodiment. Entity management systems (e.g., entity management system 140) may provide interface 500 for display on client devices (e.g., client device 131a). Interface 500 includes outlier notification window 501 that may be a pop-up displayed over a main window displaying information managed by system 140 (e.g., a function monitor). Window 501 may include a notification generated by function monitor manager 230 in response to an outlier being detected by entity outlier classifier 220. The notification may include a prompt to confirm the accuracy of the outlier classification, which may be displayed through feedback buttons 502 that allow the user to select "Affirm" or "Reject." If the user chooses to affirm the outlier classification, function monitor manager 230 may generate a function monitor field (e.g., for display in interface 500) to track functions needed to be performed to address the detected outlier. If the user chooses to reject the classification, manager 230 may take no action to generate a function monitor field since the user has indicated there is no outlier to address. Model training engine 221 uses the user's selection of one of feedback buttons 502 to retrain a machine learning model of entity outlier classifier 220. In some embodiments, system 140 may generate entity monitor fields corresponding to detected outliers before notifying the user to confirm whether the classification is accurate. If the user rejects the classification, system 140 may remove a function monitor field that was inaccurately classified as an outlier from the GUI.

Figure 6:
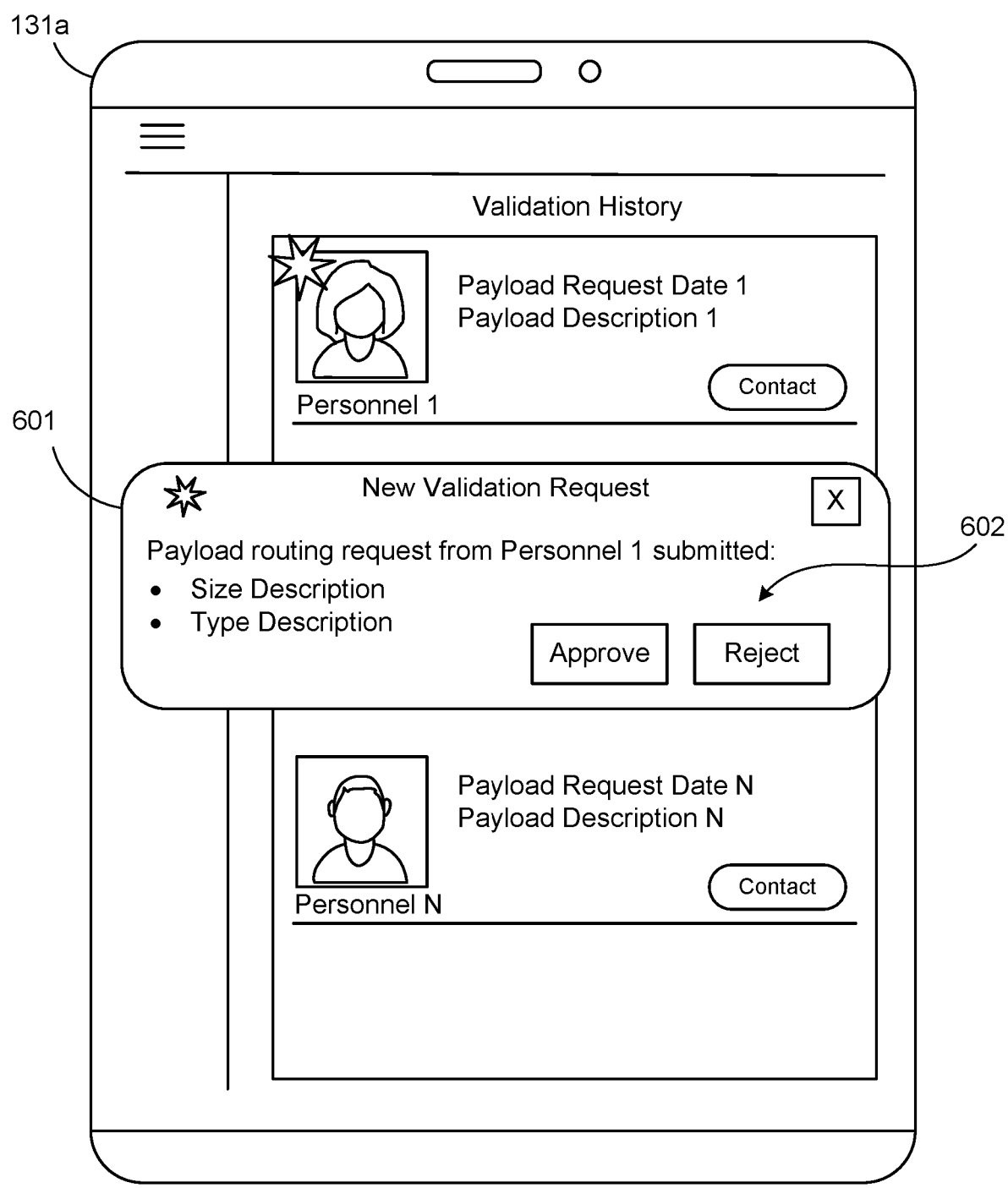
FIG. 6 depicts a GUI for managing payload validation, in accordance with at least one embodiment.

FIG. 6 depicts GUI 600 for managing payload validation, in accordance with at least one embodiment. Entity management systems (e.g., entity management system 140) may provide interface 600 for display on client devices (e.g., client device 131a). Interface 600 includes outlier notification window 601 that may be a pop-up displayed over a main window displaying information managed by system 140 (e.g., a history of validations). Window 601 may include a notification generated by validation module 240 in response to an outlier being detected by entity outlier classifier 220. The notification may include a prompt to confirm the accuracy of the outlier classification, which may be displayed through feedback buttons 602 that allow the user to select "Affirm" or "Reject." If the user chooses to affirm the outlier classification, module 240 may cancel the payload routing request, recommend a modification of the payload routing request (e.g., to the author of the request), or a combination thereof. If the user chooses to reject the classification, module 230 may route the payload to the requested destination. Model training engine 221 uses the user's selection of one of feedback buttons 602 to retrain a machine learning model of entity outlier classifier 220.

Computing Machine Architecture

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alpha-numeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Processes for Machine-Learned Classifications in an Entity Management System

Figure 8:
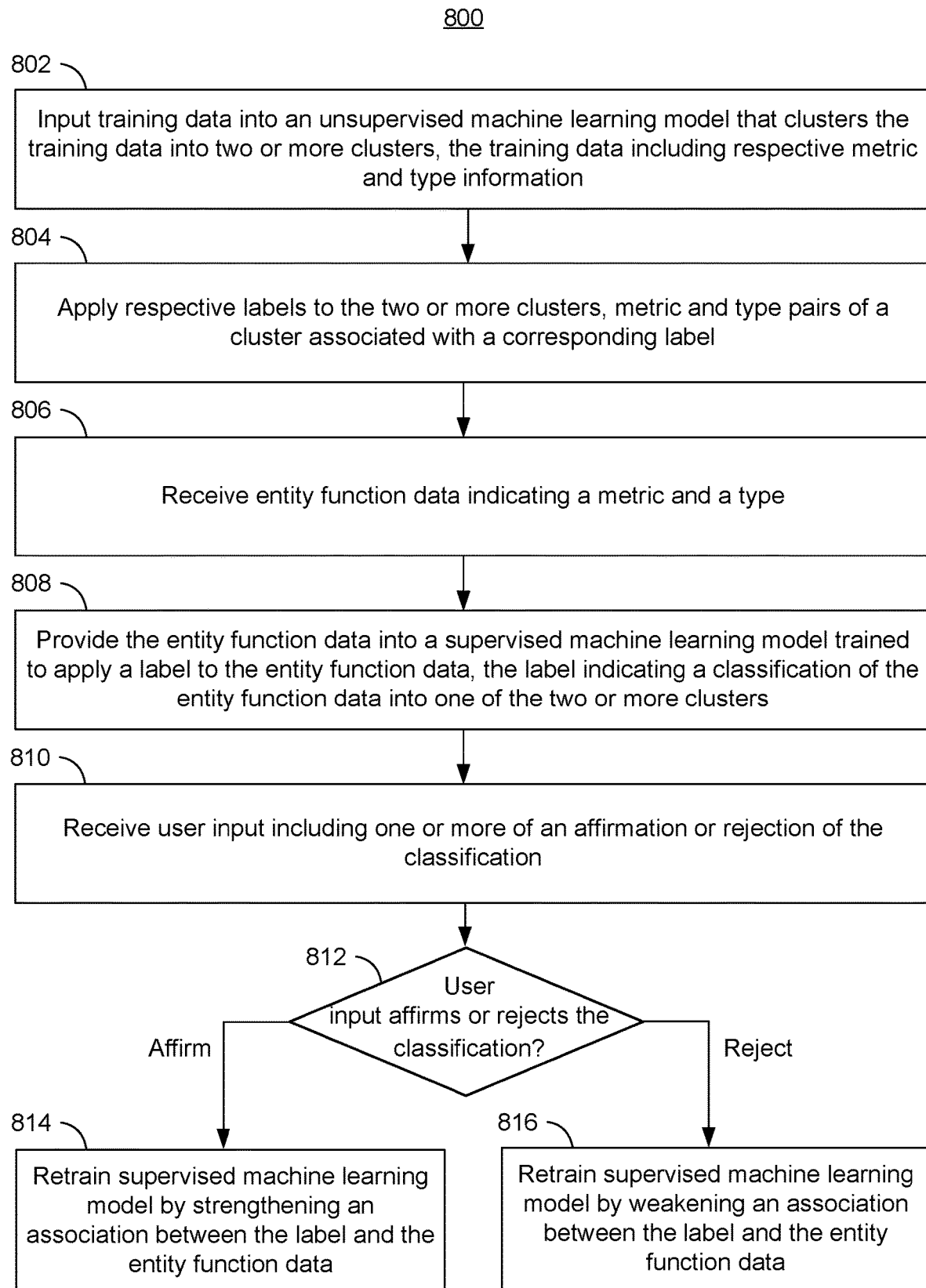
FIG. 8 is a flowchart illustrating a process for classifying entity function data using a machine learning model and retraining the machine learning model using user feedback, in accordance with at least one embodiment.

FIG. 8 is a flowchart illustrating process 800 for classifying entity function data using a machine learning model and retraining the machine learning model using user feedback, in accordance with at least one embodiment. Entity management system 140 may perform process 800. In some embodiments, system 140 performs operations of process 800 in parallel or in different orders, or may perform different steps.

Entity management system 140 inputs 802 training data into an unsupervised machine learning model that clusters the training data into two or more clusters. The training data may include respective metric and type information. For example, training data includes historical entity function records of entity 130a stored within entity function database 200. Where entity 130a is an automotive supplier, entity function records may include metrics used to evaluate the performance of functions performed by the automotive supplier (e.g., trading automobiles, repairing automobiles, maintaining an inventory of parts, generating promotions to market their products and services, internal management and record keeping, etc.) and the types of those functions (e.g., sales, repair, marketing, entity management, etc.). The unsupervised machine learning model (e.g., unsupervised machine learning model 222) may cluster the training data into at least two clusters. The training data may be structured into metric and type pairs such that the clusters are partitions of the paired data.

Entity management system 140 applies 804 respective labels to the two or more clusters. The metric and type pairs of a cluster may be associated with a corresponding label. For example, system 140 prompts a user to label one of the clusters using a "non-outlier" label and another cluster using an "outlier." In some embodiments, there may be multiple labels that indicate a data cluster is an outlier, where each outlier label corresponds to a level of deviation from what is considered to be a "non-outlier" (e.g., an expected value or range). Where entity 130a is an automotive supplier, system 140 may apply a "non-outlier" label to entity function records representative of, for example, a monthly number of automobiles repaired that fall within an expected range of numbers for the type of function, "repair." Additionally, system 140 may apply an "outlier" label to records that represent a monthly number of automobiles repaired that fall outside of the expected range (i.e., too few or too many repaired).

Entity management system 140 receives 806 entity function data indicating a metric and a type. A user of entity 130a may manually input an entity function record for classification or system 140 may periodically access data from entity function database 200 to perform periodic outlier detection on the latest entity function data. For example, system 140 receives entity function data describing automobile repairs made within a year, including the number of repairs. This number may indicate a metric of a monthly frequency of repairs made and a type related to "repair."

Entity management system 140 provides 808 the entity function data into a supervised machine learning model trained to apply a label to the entity function data. The label may indicate a classification of the entity function data into one of the two or more clusters. For example, the entity function data describing automobile repairs may be input into general function model 223 or entity-specific function model 224 of entity outlier classifier 220. These machine learning models output a classification of the entity function data as an outlier or a non-outlier. For example, a count of twelve repairs in a year is labeled as an outlier because the metric for repairs indicates that an average of five repairs are expected each month while only an average of one repair was made a month.

Entity management system 140 receives 810 user input including one or more of an affirmation or rejection of the classification. System 140 may generate an interface as shown in FIG. 5 to prompt a user for input affirming or rejecting the classification of entity record data. Continuing the automotive example, the user may select a button on an interface indicating that the average repair count of one per month was not an outlier because the entity had recently outsourced its repairs to other entities and was doing much fewer repairs itself. In another example, the user may provide input affirming the repair count is an outlier because repair requests were being redirected, unexpectedly and undesirably, to another automotive supplier.

Entity management system 140 determines 812 whether the user input affirms or rejects the classification. If the user input affirms the classification, entity management system 140 retrains 814 the supervised machine learning model by strengthening an association between the label and the entity function data. For example, system 140 includes the labeled data output by the supervised machine learning model into a supplemental training set used in the next iteration of training the model. If the user input rejects the classification, entity management system 140 retrains 816 the supervised machine learning model by weakening an association between the label and the entity function data. For example, system 140 modifies the label that was applied by the supervised machine learning model to account for the user input and includes the re-labeled data into a supplemental training set used in the next iteration of training the model.

Figure 9:
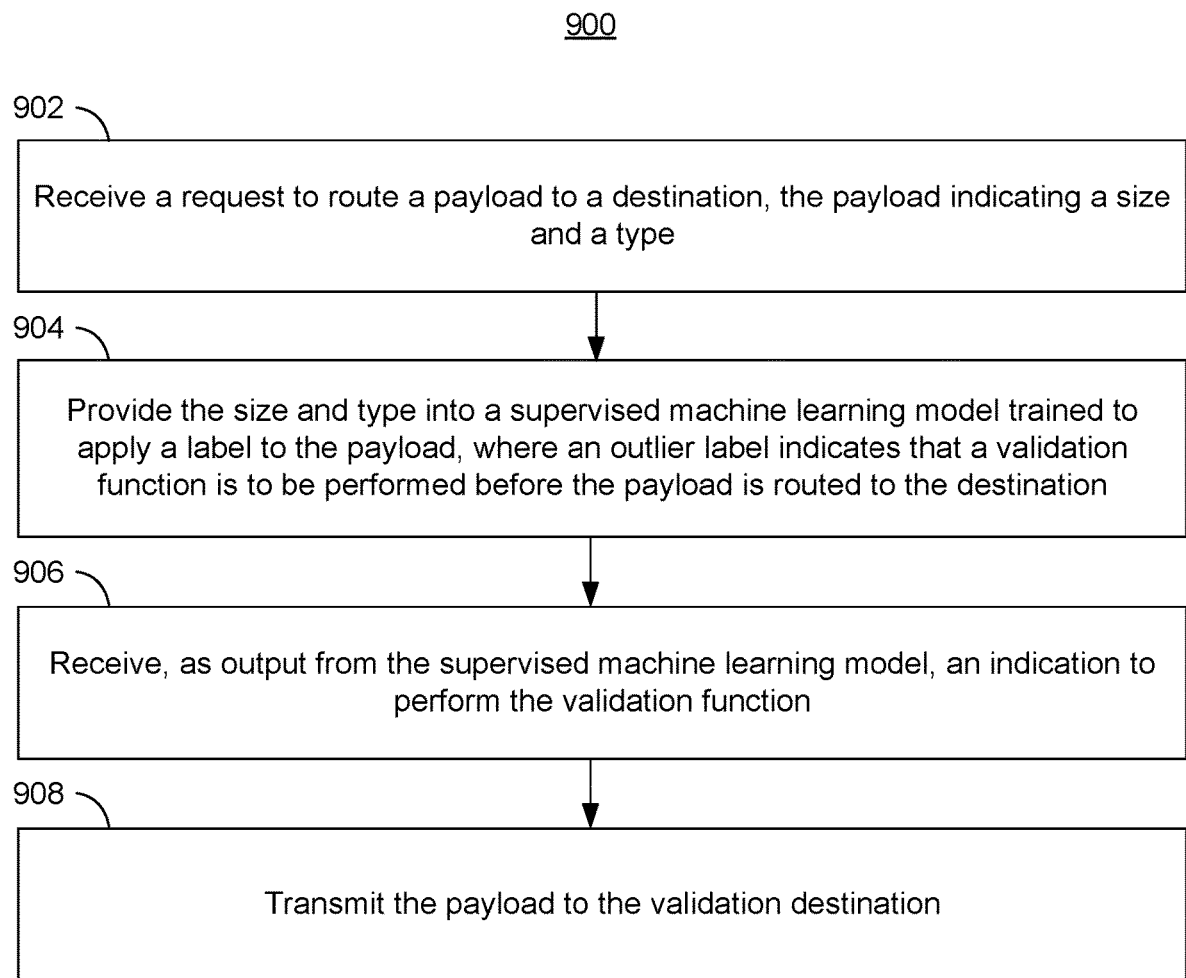
FIG. 9 is a flowchart illustrating a process for classifying payload data using a machine learning model and determining to transmit the payload to a validation destination, in accordance with at least one embodiment.

FIG. 9 is a flowchart illustrating process 900 for classifying payload data using a machine learning model and determining to transmit the payload to a validation destination, in accordance with at least one embodiment. Entity management system 140 may perform process 900. In some embodiments, system 140 performs operations of process 900 in parallel or in different orders, or may perform different steps.

Entity management system 140 receives 902 a request to route a payload to a destination. The payload may indicate a size and a type. For example, client device 131*b* of entity 130*a*, an automotive supplier, may generate a request to route a payload to entity 130*b*. The payload may include automotive parts to be routed entity 130*b*, the destination, where the type of payload may be "inventory."

Entity management system 140 provides 904 the size and type into a supervised machine learning model trained to apply a label to the payload. The supervised machine learning model may apply one of various labels corresponding to whether the cluster is an outlier or not, where one of the labels may be an outlier cluster label. The outlier label may indicate that a validation function is to be performed before the payload is routed to the destination. In one example, the size and type data (i.e., components of payload data) describing the payload requesting routing automotive parts to entity 130*b* may be input into general payload model 225 or entity-specific payload model 226 of entity outlier classifier 220. These machine learning models output a classification of the payload data as an outlier or a non-outlier. For example, a payload of ten parts to be routed to entity 130*b* is labeled as an outlier because the expected amount of parts routed is one part. This outlier label may indicate that the validation function should be performed where system 140 generates a notification on client device 131*a* alerting a supervisor of the outlier payload routing request.

Entity management system 140 receives 906, as output from the supervised machine learning model, an indication to perform the validation function. Continuing the automotive example, the payload routing request of ten parts is labeled as an outlier by system 140. The system's application of the label may be the indication to perform the validation function of generating the notification on client device 131*a* alerting the supervisor of the outlier payload routing request.

Entity management system 140 transmits 908 the payload to the validation destination. In some embodiments, the validation destination may be specified in the validation function to be performed upon detecting an outlier. For example, the validation destination may be client device 131*a* specified in a validation function. System 140 may transmit the payload or the payload routing request to a validation destination. For example, system 140 may transmit the payload routing request for ten automotive parts to be routed to entity 130*b* to client device 131*a* for validation. Once client device 131*a* has validated (e.g., authorized) the payload routing request, system 140 may route the payload to the desired destination (e.g., authorizing the author of the payload request to access the automotive parts for entity 130*b*).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:
   input training data into an unsupervised machine learning model, each entry of the training data including respective metric and type information, wherein the unsupervised machine learning model clusters the training data into two or more clusters, at least one of the two or more clusters identified as an outlier cluster;
   apply respective labels to the two or more clusters, wherein metric and type pairs of a cluster are associated with a corresponding label of the cluster;
   receive entity function data, the entity function data indicating a metric and a type of a function performed by an entity, the metric measuring the performance of the function by the entity, the type categorizing the function among a plurality of functions performed by the entity;
   provide the entity function data into a supervised machine learning model, the supervised machine learning model trained using the labeled two or more clusters to apply a label to the entity function data, wherein the label indicates a classification of the entity function data into one of the two or more clusters;
   receive user input comprising one of an affirmation or a rejection of the classification of the entity function data into the outlier cluster;
   in response to the user input comprising the affirmation of the classification, retrain the supervised machine learning model by strengthening an association between the label and the entity function data; and
   in response to the user input comprising the rejection of the classification, retrain the supervised machine learning model by weakening the association between the label and the entity function data.

2. The non-transitory computer-readable medium of claim 1, wherein the instructions further comprise instructions to:
   in response to classifying the entity function data into the outlier cluster:
      determine a function monitor field, wherein the function monitor field comprises one or more of a completion date, a function description, or a delegate identifier; and
      generate the function monitor field on a function monitor.

3. The non-transitory computer-readable medium of claim 2, wherein the instructions to determine the function monitor field comprise instructions to:
   identify, based on the classification of the entity function data into one of the two or more clusters, a level of deviation of the entity function data from an expected metric range, each cluster of the two or more clusters corresponding to respective levels of deviation;
   access a delegate table comprising a plurality of delegate identifiers, each delegate identifier associated with one or more of the respective levels of deviation; and
   determine the delegate identifier associated with the level of deviation.

4. The non-transitory computer-readable medium of claim 3, wherein the instructions further comprise instructions to determine the expected metric range based on historical entity function data.

5. The non-transitory computer-readable medium of claim 2, wherein the function monitor field is a first function monitor field and the function monitor is a first function monitor of a delegate, wherein the instructions further comprise instructions to generate a second function monitor field comprising the delegate identifier on a second function monitor of a supervisor.

6. The non-transitory computer-readable medium of claim 2, wherein the instructions to determine the function monitor field comprise instructions to:
   provide the entity function data into a statistical model, the statistical model configured to determine one or more of a likely completion date, a likely function description, or an identifier of a likely delegate by:
      determining, based on historical entity function data and historical function monitor data comprising user-specified function monitor fields, a plurality of correlations between the user-specified function monitor fields and historical metric and type information.

7. The non-transitory computer-readable medium of claim 2, wherein the entity function data is a first set of entity function data of a first entity, and wherein the instructions to generate the function monitor field comprise instructions to:
determine, based on a second set of entity function data of a second entity, the delegate identifier of the function monitor field, a metric of the second set of entity function data associated with the delegate identifier.

8. The non-transitory computer-readable medium of claim 2, wherein weakening the association between the label and the entity function data reduces a likelihood that the entity function data is classified into the outlier cluster and reduces a corresponding likelihood that the function monitor field is generated on the function monitor.

9. The non-transitory computer-readable medium of claim 1, wherein the metric comprises one or more of a difference between current entity function data and historical entity function data of the type or forecasted value of the entity function data.

10. The non-transitory computer-readable medium of claim 1, wherein the respective labels are specified by a user.

11. A method comprising:
providing for display within a graphical user interface (GUI) at a client device a function monitor comprising one or more function monitor fields corresponding to respective entity functions, wherein a function monitor field of the one or more function monitor fields is determined by:
inputting training data into an unsupervised machine learning model that clusters the training data into two or more clusters, at least one of the two or more clusters identified as an outlier cluster;
applying respective labels to the two or more clusters; and
providing entity function data into a supervised machine learning model, the supervised machine learning model trained using the labeled two or more clusters to apply a label to the entity function data, wherein the label indicates a classification of the entity function data into the outlier cluster, the entity function data indicating a metric and a type of a function performed by an entity, the metric measuring the performance of the function by the entity, the type categorizing the function among a plurality of functions performed by the entity;
receiving, at the GUI, user input comprising one of an affirmation or a rejection of the classification of the entity function data into the outlier cluster; and
transmitting an instruction causing the supervised machine learning model to be retrained based on the user input.

12. The method of claim 11, further comprising:
in response to classifying the entity function data into the outlier cluster:
determining the function monitor field, wherein the function monitor field comprises one or more of a completion date, a function description, or a delegate identifier.

13. The method of claim 12, wherein determining the function monitor field comprises:
identifying, based on the classification of the entity function data into one of the two or more clusters, a level of deviation of the entity function data from an expected metric range, each cluster of the two or more clusters corresponding to respective levels of deviation;
accessing a delegate table comprising a plurality of delegate identifiers, each delegate identifier associated with one or more of the respective levels of deviation; and
determining the delegate identifier associated with the level of deviation.

14. The method of claim 12, further comprising, in response to the user input comprising the rejection, weakening the association between the label and the entity function data by:
reducing a likelihood that the entity function data will be classified into the outlier cluster; and
reducing a corresponding likelihood that the function monitor field will be generated on the function monitor.

15. The method of claim 12, further comprising, in response to the user input comprising the rejection, removing for display within the GUI the function monitor field from the function monitor.

16. A system comprising:
memory with instructions encoded thereon; and
one or more processors that, when executing the instructions, are caused to perform operations comprising:
inputting training data into an unsupervised machine learning model, each entry of the training data including respective metric and type information, wherein the unsupervised machine learning model clusters the training data into two or more clusters, at least one of the two or more clusters identified as an outlier cluster;
applying respective labels to the two or more clusters, wherein metric and type pairs of a cluster are associated with a corresponding label of the cluster;
receiving entity function data, the entity function data indicating a metric and a type of a function performed by an entity, the metric measuring the performance of the function by the entity, the type categorizing the function among a plurality of functions performed by the entity;
providing the entity function data into a supervised machine learning model, the supervised machine learning model trained using the labeled two or more clusters to apply a label to the entity function data, wherein the label indicates a classification of the entity function data into one of the two or more clusters;
receiving user input comprising one of an affirmation or a rejection of the classification of the entity function data into the outlier cluster;
in response to the user input comprising the affirmation of the classification, retraining the supervised machine learning model by strengthening an association between the label and the entity function data; and
in response to the user input comprising the rejection of the classification, retraining the supervised machine learning model by weakening the association between the label and the entity function data.

17. The system of claim 16, wherein the operations further comprise:
in response to classifying the entity function data into the outlier cluster:
determining a function monitor field, wherein the function monitor field comprises one or more of a completion date, a function description, or a delegate identifier; and
generating the function monitor field on a function monitor.

18. The system of claim 17, wherein determining the function monitor field comprises:
  identifying, based on the classification of the entity function data into one of the two or more clusters, a level of deviation of the entity function data from an expected metric range, each cluster of the two or more clusters corresponding to respective levels of deviation;
  accessing a delegate table comprising a plurality of delegate identifiers, each delegate identifier associated with one or more of the respective levels of deviation; and
  determining the delegate identifier associated with the level of deviation.

19. The system of claim 17, wherein weakening the association between the label and the entity function data reduces a likelihood that the entity function data is classified into the outlier cluster and reduces a corresponding likelihood that the function monitor field is generated on the function monitor.

20. The system of claim 16, wherein the metric comprises one or more of a difference between current entity function data and historical entity function data of the type or forecasted value of the entity function data.

\* \* \* \* \*